United States Patent [19]

Panick et al.

[11] Patent Number: 4,923,033
[45] Date of Patent: May 8, 1990

[54] HEATING DEVICE, PARTICULARLY AUTOMOTIVE HEATING DEVICE, WITH AN INTEGRATED MUFFLER

[75] Inventors: Karl Panick, Planegg; Friedrich Widemann, Munich; Hermann Schoenberger, Germering; Johann Sperl, Penzberg; Johann Sondermeier, Krailling, all of Fed. Rep. of Germany

[73] Assignee: Webasto AG Fahrzeugtechnik, Gauting, Fed. Rep. of Germany

[21] Appl. No.: 183,232

[22] Filed: Apr. 19, 1988

[30] Foreign Application Priority Data

Apr. 22, 1987 [DE] Fed. Rep. of Germany ....... 3713476
Apr. 22, 1987 [DE] Fed. Rep. of Germany ....... 3713448

[51] Int. Cl.⁵ .................................................. F01N 5/00
[52] U.S. Cl. ..................................... 181/211; 181/231; 181/250; 181/252; 181/258; 181/270; 136/116 R
[58] Field of Search ............... 181/211, 231, 240, 270, 181/250, 252, 255, 258; 126/19.5, 116 R

[56] References Cited

U.S. PATENT DOCUMENTS

| | | | |
|---|---|---|---|
| 2,404,617 | 7/1946 | Budlave | 126/116 R |
| 2,452,779 | 11/1948 | McCollum | 126/116 R X |
| 2,482,987 | 9/1949 | McCollum | 181/211 X |
| 3,092,206 | 6/1963 | Moreau | 181/270 |
| 3,556,734 | 1/1971 | Peterson | 181/270 X |
| 3,989,029 | 11/1976 | Friedl et al. | 126/116 R X |
| 4,015,683 | 4/1977 | Williams | 181/231 |
| 4,350,223 | 9/1982 | Takei | 181/250 X |
| 4,408,679 | 11/1983 | Lattrell | 181/252 X |
| 4,601,168 | 7/1986 | Harris | 181/255 X |

FOREIGN PATENT DOCUMENTS

| | | |
|---|---|---|
| 8410034 | 7/1984 | Fed. Rep. of Germany . |
| 3413968 | 10/1985 | Fed. Rep. of Germany . |
| 3425259 | 1/1986 | Fed. Rep. of Germany . |
| 3532777 | 3/1987 | Fed. Rep. of Germany . |

Primary Examiner—B. R. Fuller
Attorney, Agent, or Firm—Sixbey, Friedman, Leedom & Ferguson

[57] ABSTRACT

A heating device, particularly an automotive heating device, in which a noise muffling device is integrated within the heating device. The muffler can be provided in the combustion pipe defining the combustion chamber, or the combustion pipe, itself, can be designed as the muffler. The muffler operates by absorption and/or reflection sound muffling techniques in accordance with various embodiments, and may, simultaneously, purify the combustion gases, for example, by catalytic afterburning, and/or by filtering of soot particles. The muffler is arranged in a hot zone, but not in the flame area of the combustion chamber, to achieve a self-cleaning action. In other embodiments, noise muffling material is arranged in an exhaust gas collection chamber to achieve sound muffling based on reflection and/or absorption and/or other conventional sound reduction methods. In all cases, the need for an external muffler in the exhaust line from the heating device is eliminated.

32 Claims, 8 Drawing Sheets

HEATING DEVICE, PARTICULARLY AUTOMOTIVE HEATING DEVICE, WITH AN INTEGRATED MUFFLER

BACKGROUND OF THE INVENTION

1. Field of the Invention

The invention relates to a heating device, particularly an automotive heating device which can be operated with liquid or gaseous fuel. Conventionally, such a heating device has a burner, and a combustion chamber that is defined by a combustion pipe.

2. Description of Related Art

German Offenlegungsschrift 35 32 777 discloses a burner where there is a sleeve-shaped baffle within the flame zone which directs the hot gases in a funnel-shaped motion to a slotted baffle. The baffle slots act as a flame disperser and facilitate an acoustic uncoupling of the burner from other units, like a boiler room or furnace, which results in a muffling of the noise of the burner. The baffle arranged in the flame zone of the burner can also serve as a catalytic agent to reduce pollutants, if required. To this end, the side of the baffle facing the combustion area can be coated with a layer of the catalytic material.

German Offenlegungsschrift 34 13 968 and German Gebrauchsmuster 84 10 034 refer to baffle plates arranged in the combustion chamber, particularly in the area of the flame zone, which carry an exhaust gas catalyst for the removal of pollutants from the combustion gases, particularly NOx.

German Offenlegungsschrift 34 25 259 describes a heat generator with overpressure combustion on an oil or gas basis, having a combustion chamber and a deflection chamber. For the purpose of purification of the exhaust gases, a catalyst is arranged in the deflection chamber, as a coating at the wall of the deflection chamber and/or at the outer surface of an inner cylinder in the combustion chamber.

In conventional heating devices, particularly automotive heating devices, an exhaust gas muffler for silencing the combustion noises is provided and is installed in an exhaust gas line externally of the heating device. Exhaust gas mufflers of this kind represent a separate component which has to be separately manufactured and installed. More specifically, such a muffler is exposed to corrosion from both the outside and the inside. Furthermore, in the startup phase of the heating device, problems may arise which are caused by wet exhaust gases occurring due to the existence of temperatures below the condensation point during the partial load phase as well as during periods with low outside temperatures. This, in turn, can lead to formation of ice and may cause increased resistance in the area of the externally arranged waste gas muffler, leading to a deterioration of the combustion process, and a breakdown of the heating device in extreme cases.

SUMMARY OF THE INVENTION

It is a primary objective of the present invention to provide a heating device, particularly an automotive heating device, which overcomes the problems outlined above and achieves noise silencing without the employment of an external exhaust gas silencing unit. Moreover, in accordance with another aspect of the invention, the design of the heating device is such that, if needed, pollutants like CO and the like, or soot particles, can be removed from the combustion gases.

In accordance with preferred embodiments of the invention, a heating device, particularly an automotive heating device, having a burner and a combustion chamber defined by a combustion pipe, is improved by a muffler being built into the heating device itself. The manufacture of such device is simplified by the fact that an external muffler does not have to be separately installed.

Advantageously, the combustion chamber is designed as a muffler. Therefore, in the inventive heating device, the noise reduction measures can already be realized in the area of the combustion chamber, thereby eliminating the need for an externally installed waste gas muffler. As a consequence, not only is there a simplification with regard to the installation of such heating device, but, moreover, it is possible to muffle the combustion noises of the burner unit of the heating device in close proximity to their origin, with the benefit of a considerably reduced noise level during operation of such a heating device. To this end, the muffler is arranged in a flame-free, yet relatively hot (for example, 1000°–1200° C.), zone of the combustion chamber. The arrangement of the muffler in such a high temperature area of the combustion chamber has the further benefit of a self-cleaning action by the muffler during the operation of the device which, in turn, prevents the muffler material from disintegrating and ensures an effective muffling of noise and/or cleaning of waste gases over an extended period of time.

In accordance with a preferred embodiment of the invention, the muffler simultaneously serves as a purifier of the combustion gases, whereby a catalytic conversion of harmful combustion components is effected. In a heating device using Diesel fuel as a liquid fuel, soot particles can be filtered from the combustion gases by means of a muffler, whereby the filter material is automatically burned clean of the filtered soot particles as a consequence of its particular inventive arrangement in the hot zone of the combustion chamber.

The muffler in the combustion chamber can be either a reflection muffler and/or an absorption muffler, whereby it is to be understood that both muffler techniques can be combined. Preferably, the muffler consists of a heat-resistant, perforated, or porous material which simultaneously performs a filter function and a noise muffling function by reason of its perforated or porous finish.

In accordance with a preferred embodiment of the invention, the muffler is formed of a lining of the combustion pipe and/or of a flame supporting insert. Thus, these parts in the combustion chamber of the heating device, simultaneously, serve as a carrier for the muffler. To this end, the lining, advantageously, can consist of a fibrous pipe, which is formed by impregnating a heat-resistant fleece material with a hardening agent, thereby giving it a pipe-like configuration.

In order to utilize as much of the total axial longitudinal extent of the combustion chamber as possible in the process of noise muffling and/or exhaust gas purification, the fibrous pipe, preferably, has an axial length which is longer than the length of the combustion pipe. As a result, the free end of the fibrous pipe, for instance, can closely adapt to the heat transfer rate, whereby the combustion gases at the end of the combustion chamber are forced to pass through the muffler before they are deflected, prior to entering the heat exchanger.

In accordance with another embodiment of the invention, the lining, at least in the area of the combustion chamber outlet, has radial through openings which are peripherally distributed. Preferably, the radial openings are arranged in several axially spaced rows, the openings of adjacent rows of openings being preferably arranged in a peripherally offset manner relative to each other. A configuration of this kind facilitates a muffling of noises by a combination of reflection and absorption techniques.

Another embodiment of a heating device with an integrated muffler is characterized in that at least one muffler insert, forming the muffler, is arranged in the area of the combustion pipe and extends across its transverse section. Such a muffler insert has at least one axial through opening, and when several openings are provided, they are distributed across its transverse surface. A muffler of this kind operates as a reflection muffler. Preferably, when more than one muffler insert is provided, the axial through openings of adjacent muffler inserts are arranged in an offset manner, and each muffler insert surrounds a perforated sheet having axial through openings, which acts as a holder. The perforated sheet has noise muffling material provided thereon, which material, in this case, can be a fibrous material such as fleece wool.

Advantageously, the noise muffling material, simultaneously, serves to catalytically treat the flow of combustion gases. For this purpose, the configuration can be such that layers of muffling material and layers of catalytic material are distributed across the transverse surface, preferably in an alternating pattern.

In all embodiments of the device described previously, the muffler material may consist of noise reducing fleece material adhesively affixed at the combustion pipe and/or at the flame supporting insert. Such arrangement eliminates the need for additional control elements in the area of the combustion chamber and facilitates accommodation of the muffler in the chamber in a space-saving manner without impairment of combustion efficiency.

It is to be understood that such a muffler not only finds application with a heating device operating with a gaseous heat carrier, like an air heating device, but also with a heating device operating with a liquid heat carrier, like a water heating device. Moreover, the inventive measures can be realized with heating devices operating with both liquid fuel and gaseous fuel.

In accordance with another aspect of the invention, a heating device is provided, particularly an automotive heating device, having a burner and a combustion chamber, of the type whereby hot combustion gases exiting from the combustion chamber pass through a heat exchanger, in a counter-flow manner, and reach an exhaust gas collection chamber in the general vicinity of the burner before exiting from the heating device via an exhaust gas outlet; in which device the exhaust gas collection chamber is designed as a muffler. To this end, a heating device of this kind is provided which affords an effective muffling of combustion exhaust gas noises, with the added benefits of simplified manufacture and cost-effective installation.

In such an inventive heating device, the means to accomplish muffling of noises in connection with the exhaust gases are integrated into the heating device itself, so that supplemental components can be dispensed with, and installation of such heating device is simplified. Furthermore, since the noises of the combustion gases are muffled immediately after passage through the heat exchanger, and before exiting the heating device, a heating device is obtained which operates very quietly, as evidenced by the fact that the combustion noises can hardly be detected anymore.

The muffler in the exhaust gas collection chamber can effect a suppression of noises based on the principles of reflection and/or absorption, and/or the technique based on the Helmholtz principle, by employment of a cavity resonator. Consequently, essential fundamental noise muffling methods can be applied individually, or in combination, for a noise reduction in the exhaust gas collection chamber. This means that an extremely effective and reliable noise reduction is achieved, while making maximum use of the space available in the waste gas collection chamber.

Preferably, a noise muffling material is arranged in the exhaust gas collection chamber which can, for example, be in the form of an annular disk. Such a layout is simple in its construction, and, accordingly, easily realized. Corresponding tests have shown the noise muffling obtained to be satisfactory. The concept is also a very cost-effective one, since the silencing material required does not have to be highly heat-resistant due to the fact that the combustion gases have cooled during their passage through the heat exchanger. Another positive feature is that problems which may arise in connection with the condensation point are reduced.

In accordance with a preferred embodiment of the invention, the muffler material contacts a wall of the burner facing toward the heat exchanger and is distanced from the heat exchanger in an axial direction. Such an arrangement of the muffler material also facilitates interruption of the flow of heat from the combustion gases in the exhaust gas collection chamber to the nearby burner device, so that simultaneously with the muffling of noise, a heat insulation of the burner is achieved.

In accordance with another aspect of the invention, the sound absorbing muffler material has openings in a configuration which has these openings extending in an axial direction relative to the combustion gas flow channels of the heat exchanger. Such a layout facilitates that each portion of the flow of combustion gases between two adjacent fins of the heat exchanger can enter into a coordinated opening in the muffler material to ensure effective noise muffling while utilizing the effects of reflection and absorption.

Preferably, the muffler material is attached to a holder which extends into the exhaust gas collection chamber, thereby facilitating an arrangement of the muffler material in the collection chamber which provides maximum use of absorption and reflection factors in connection with the muffling process.

In accordance with still another embodiment of a heating device based on the invention, the muffler, instead of being arranged in the exhaust gas collection chamber, is disposed in an area of the exhaust gas flow which is immediately in front of the exhaust gas collection chamber. For example, that part of axially extending fins, on a peripheral wall of the heat exchanger, which are located in front of the exhaust gas collection chamber and are directed towards the exhaust gas flow, contributes only very insignificantly, at this point, towards the heat transfer to the heating medium, so that the fins can be eliminated in this area, thereby creating a space which then serves to accommodate the muffler. Difficulties which might arise with such placement of the muffler regarding a possible enlargement of the exhaust gas collection chamber can thus be avoided, and more particularly, it is not necessary to either enlarge the diameter of the heating device, or to select a longer length therefor. Also, this arrangement provides a relatively large cross-sectional area for the muffler, which enhances its effectiveness.

For the purpose of fixedly securing the muffler into its position, it may be advantageous to extend at least one or more fins to the circumference of the heat exchanger in an axial direction, so that the muffler can be installed such that it is coupled with regard to support and its own internal pressure system. The muffler material, similar to that in the arrangement of the muffler in the exhaust gas collection chamber, is subjected to lower temperatures after the heat exchange of hot combustion gases at the heat exchanger, so that the muffler material is not highly endangered here.

If there is to be a deflection of the exhaust gas prior to its exit from the exhaust gas outlet of the heating device, the deflection in such a muffler arrangement is effected by the muffler itself, and additional components, like a baffle ring, for instance, can be eliminated.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
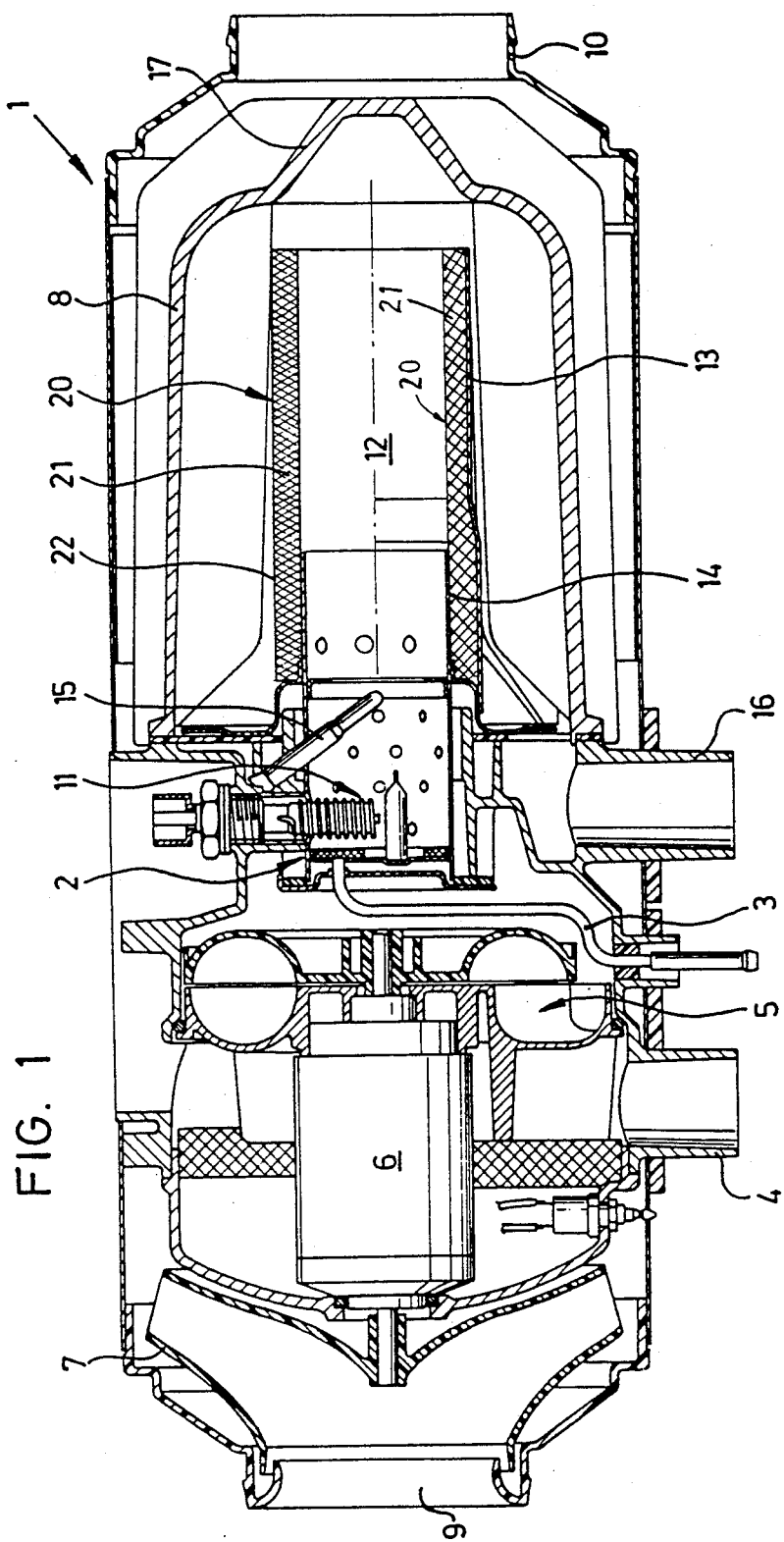
FIG. 1 is an axial, sectional view of a heating device in accordance with a preferred embodiment of the invention, wherein two design variations are shown.

Identical or similar parts in the Figures of the drawings have the same reference numerals. In the following examples, the invention is described by way of an air heating device using air as a gaseous heat carrier. However, it is to be understood that the inventive measures can also be applied to a heating device operating with a liquid heat carrier, like water. Although the following examples describe the heating device operating with a liquid fuel, like gasoline or Diesel oil, it is further to be understood that the inventive concept can correspondingly be applied to heating devices operated with a gaseous fuel.

In accordance with the examples depicted in FIGS. 1-4, a heating device designated with reference numeral 1, has a burner 2, to which liquid fuel is passed via fuel line 3.

Combustion air is drawn in from the outside via a combustion air inlet 4 and is passed to burner 2 via combustion air blower 5, preferably, by a side channel blower. The combustion air blower 5 is driven by motor 6, which simultaneously also drives axial impeller 7 which transports air, as a gaseous heat carrier, through heat exchanger 8. At one axial end of heating device 1, ambient air enters via an inlet 9, is heated by means of heat exchanger 8, and exits at the other axial end of heating device 1 via outlet 10.

In the example depicted, burner 2 of heating device 1 is a combustion burner. Numeral 11 identifies an ignition device, such as a glow plug, that extends into a combustion chamber 12 of the heating device 1, the combustion chamber 12 being defined by a combustion pipe 13. A flame supporting insert 14 is concentrically disposed in combustion pipe 13, at a distance therefrom, in the area of combustion chamber 12 that is in proximity to the combustion burner of burner 2. Reference numeral 15 denotes a flame monitoring device. A combustion mixture consisting of combustion air and fuel, formed at burner 2, is ignited by means of ignition device 11 and a flame is produced in combustion chamber 12. To this end, the flame supporting insert 14 serves to concentrate and support the flame. The hot combustion gases produced thereby, leave combustion chamber 12 at its end opposite burner 2, and are subsequently deflected to flow in a countercurrent manner, in a nearly opposite direction, through the heat exchanger 8. After passage through heat exchanger 8, the combustion gases exit heating device 1 via an exhaust gas outlet 16.

The details pertaining to the heating device described above are conventional ones, and the elements mentioned in the variations according to FIGS. 1 to 4 are identical ones.

In the top half of FIG. 1 of the drawing, a first embodiment of a muffler, designated as a whole with numeral 20, is depicted. Muffler 20 is arranged so that it serves, itself, as the combustion pipe of heating device 1. In this design of muffler 20, the muffler is a sound absorption muffler consisting of noise muffling material 21 in the form of a fibrous pipe 22 comprised of a heat-resistant, perforated or porous material. However, as shown for the muffler 20' in the bottom half of FIG. 1, the sound muffling material 21', advantageously, may be adhesively attached to the inner surface of a separate combustion pipe 13. Furthermore, sound muffling material 21' fills the annular space between flame holder insert 14 and combustion pipe 13. The noise muffling material 21, 21' does not directly come into contact with the flame of combustion chamber 12, but is disposed in the hot zone of the combustion chamber, and the hot combustion gases sweep over the noise muffling material 21, 21' beyond insert 14, thereby effectively muffling the combustion noises. Consequently, there is already a reduction in the noise of the exhaust gases in the area of the exhaust gas outlet 16 of heating device 1. Thus, an otherwise customary external exhaust gas muffler (not depicted here) can be eliminated.

Also, the noise muffler material 21, 21' can simultaneously have catalytic properties for a catalytic after-treatment of the combustion gases, and/or may have filter properties, so that in an operation using Diesel fuel, for example, soot particles in the combustion gases can be filtered out. Due to the location of the noise muffling material 21, 21', which may also have the above-described additional capabilities, harmful components of the combustion gases can be catalytically converted, and soot particles can be removed from such gases in the hot area of combustion chamber 12 (i.e., the area having prevailing temperatures of 1000°–1200° C.). As a consequence of the high temperatures prevailing in the area of the noise muffling material 21, 21', there is a self-cleaning of the muffler material 21, 21' from any soot or other combustion generated substances, thereby keeping the holes and pores of the muffler material 21, 21' open and ensuring an effective muffling of noises by the absorption process, even over extended operating periods of the heating device 1.

Figure 2:
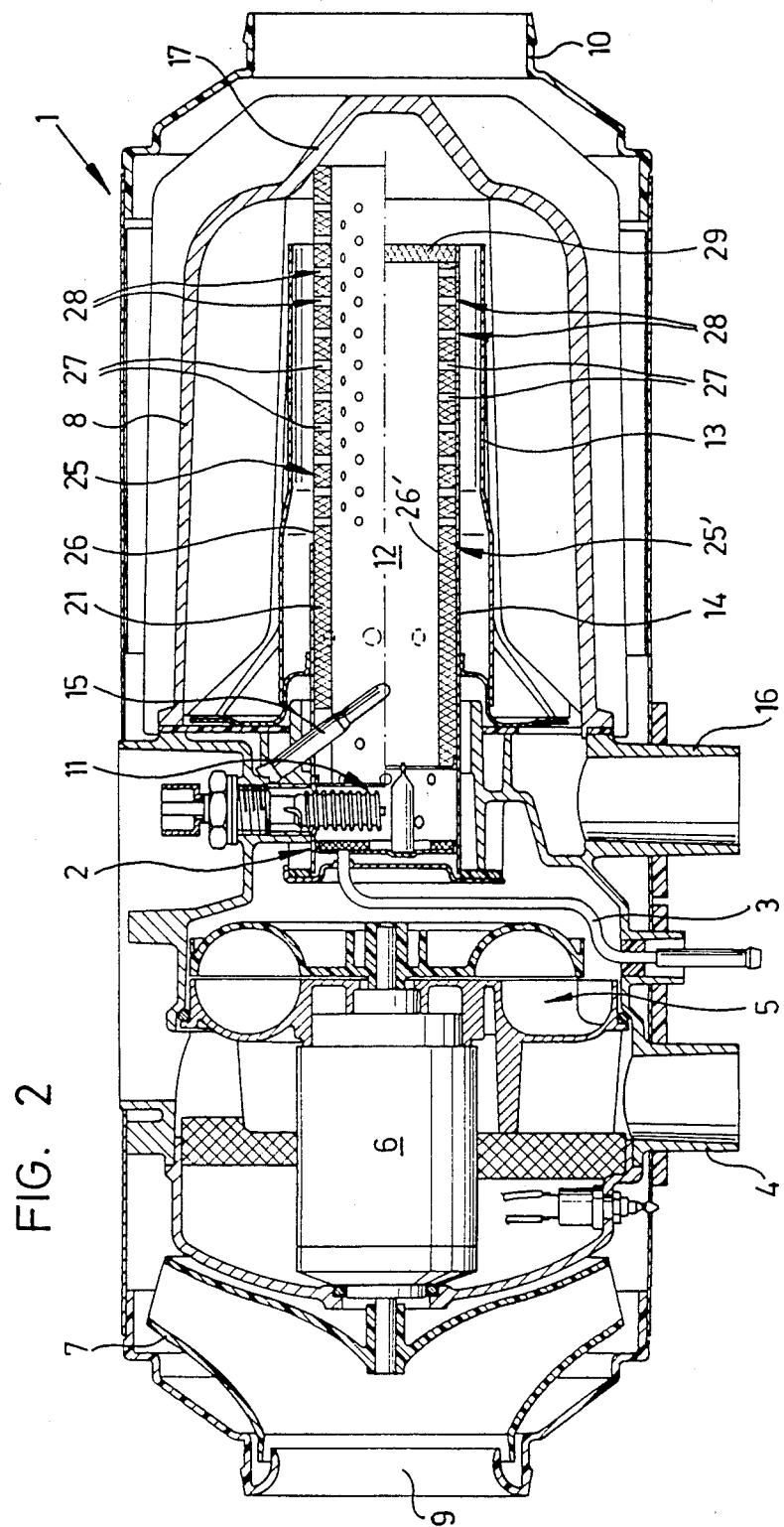
FIG. 2 is an axial, sectional view of a heating device according to a second preferred embodiment of the invention, wherein two design variations are depicted.

In FIG. 2, two varieties of another example of a noise muffler 25 or 25' are shown. In the upper half of FIG. 2, a sound muffler 25 is depicted whose design, similar to the mufflers 20, 20' of FIG. 1, is formed by a fibrous pipe 26. This fibrous pipe 26 is adhesively attached at the inner surface of flame supporting insert 14 to leave a clearance space between pipe 26 and combustion pipe 13. Additionally, the pipe 26 extends from the proximity of burner 2 to the end of combustion pipe 13 and, preferably, beyond, so that it comes into engagement with the base 17 of heat exchanger 8.

In the hot, but flame-free region of combustion chamber 12, the upper noise muffler 25 has radially extending through openings or holes 27, respectively, which in the example depicted are arranged as several peripherally extending rows of through openings 28, that are axially spaced from each other along fibrous pipe 26. For example, eight such rows of through openings 28 can be arranged such that the through openings 27 of adjacent rows of through openings 28 are disposed so as to be circumferentially offset relative to each other.

Because the end of fibrous pipe 26 engages base 17 of heat exchanger 8, the combustion gases at the outlet end of combustion chamber 12 are forced to pass through openings 27 before they reach heat exchanger 8. On the basis of a selective choice of size and range of through openings 27, as well as a corresponding arrangement of the rows of through openings 28, a muffler, such as muffler 25, can effect a muffling of noises, both by reflection as well as by absorption, resulting in a highly effective muffling of noises.

Essentially, the muffler 25' depicted in the lower half of FIG. 2, differs from the previously described muffler 25 in that the outlet end of combustion pipe 13 is covered by a disk 29, thereby causing the combustion gases to either pass through the porous noise muffling material of disk 29 or through the openings 27 of fibrous pipe 26'. To this end, the fibrous pipe 26' has an axial length which is shorter than the axial length of combustion pipe 13, by the thickness of plate 29. Here too, the noise muffling material 21 may have catalytic properties for the after-treatment of combustion gases, and/or may have filter properties for the removal of soot particles.

Figure 3:
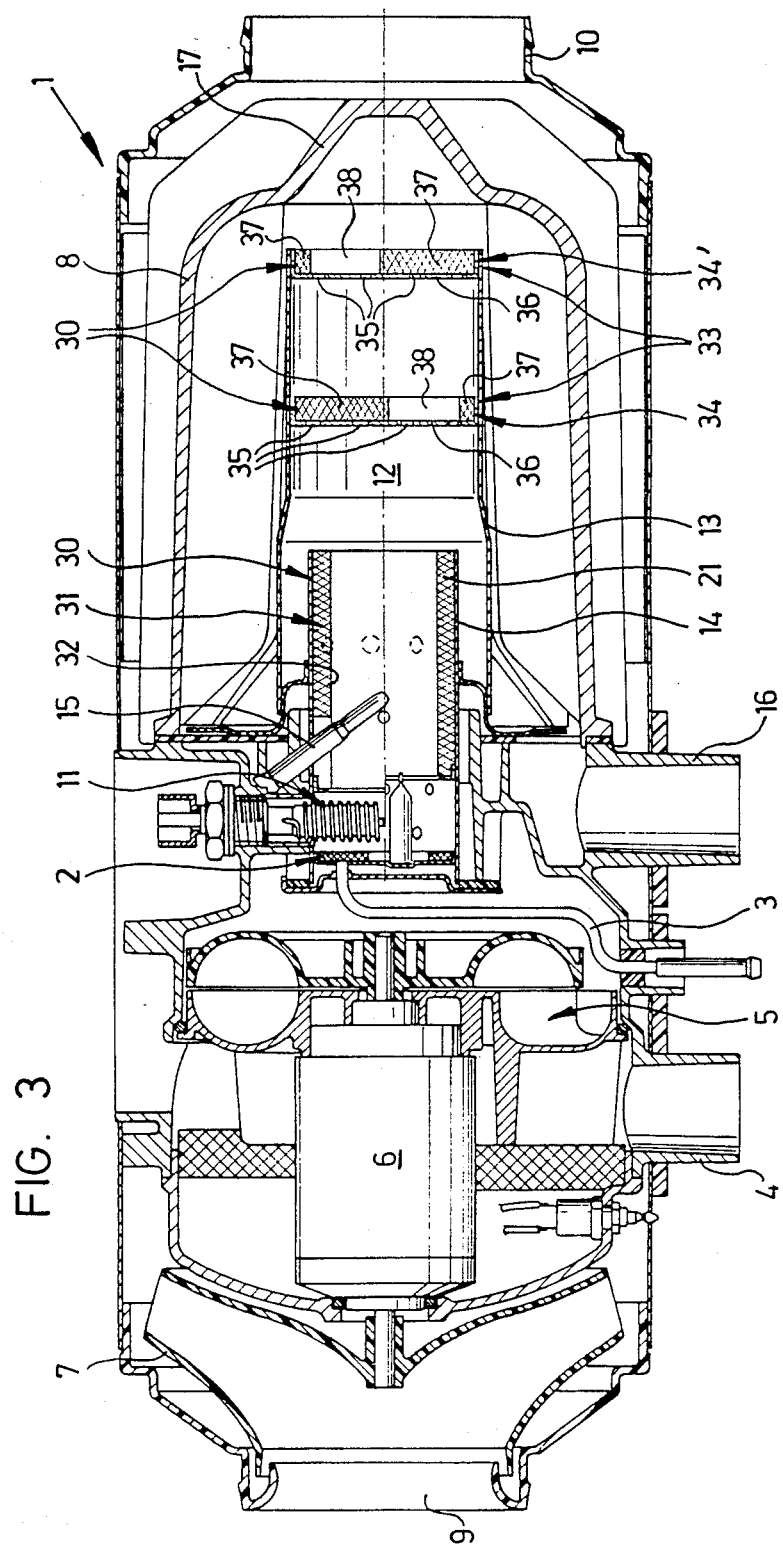
FIG. 3 is an axial, sectional view of a heating device according to an alternative embodiment utilizing a reflection muffler.

In the embodiment depicted in FIG. 3, the muffler, as a whole, is designated by reference numeral 30. This muffler has a first muffler element 31 in the form of a fibrous pipe, which, in the example depicted, is attached at the inner surface of flame supporting insert 14. This first muffler element 31 acts as an absorption muffler, similar to that in the design according to FIG. 1, for example. A second muffler element 33 of muffler 30 is arranged in the area of the hot zone of combustion pipe 13 and acts as a reflection muffler. The second muffler element 33, in the example depicted, comprises two muffler inserts 34, 34', that are axially disposed in spaced relation relative to each other, and that extend transversely across combustion pipe 13.

Each muffler insert 34, 34' has a holder 36, in the form of a perforated sheet having axial through openings 35. The sound muffling material affixed to this holder 36 is a fibrous material such as fleece wool 37. Additionally, one or more through openings 38 are distributed across the surface of each muffler insert 34, 34', to produce areas in which holder 36, designed as a perforated sheet, is free of the fibrous sound muffling material 37. The axial through openings 38 of muffler insert 34 are axially offset relative to the axial through openings 38 of muffler insert 34'. Advantageously, muffler insert 34' is disposed at, and covers, the outlet end of combustion pipe 13.

Figure 4:
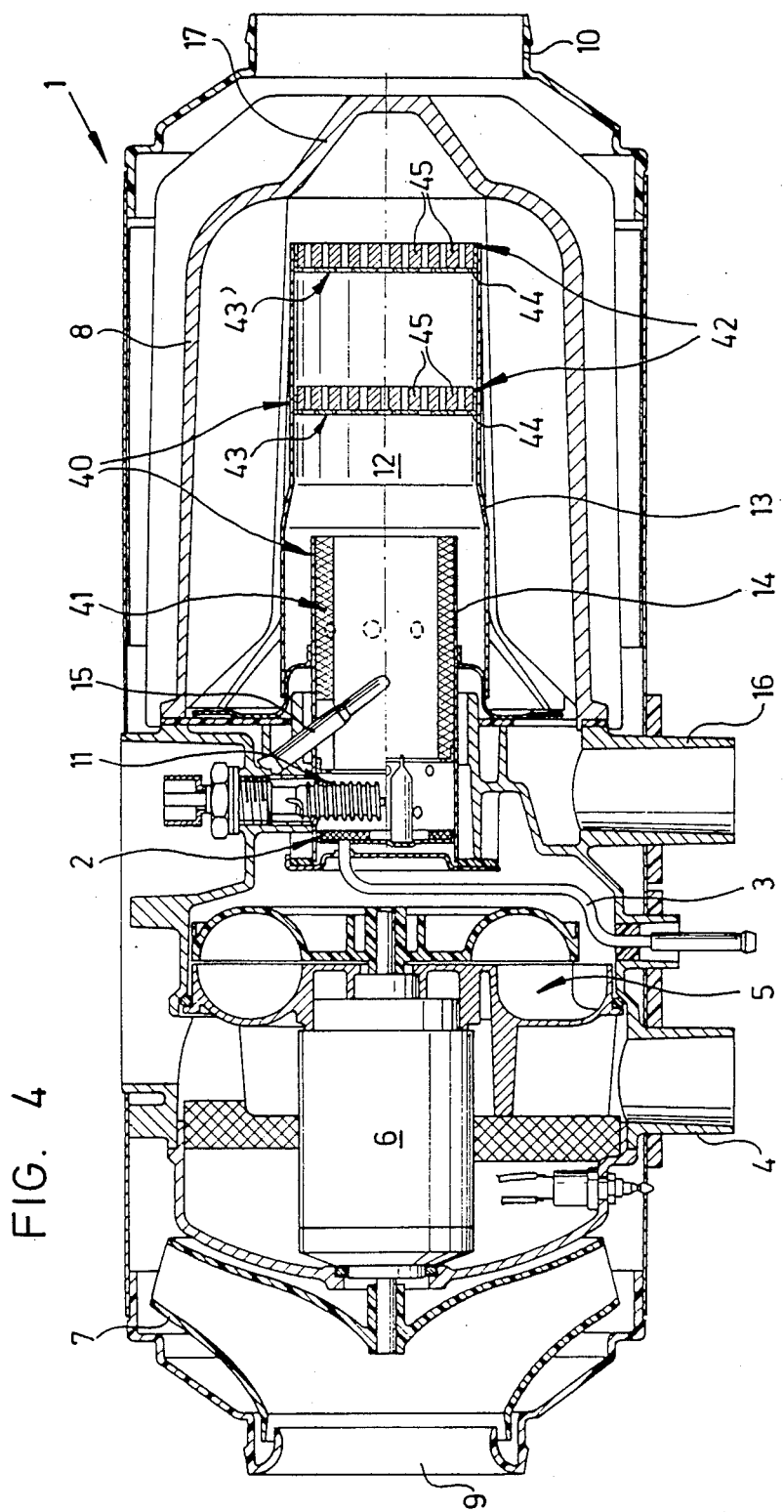
FIG. 4 is an axial, sectional view of a heating device showing a combination of a muffler and a catalytic combustion gas after-treatment device.

FIG. 4 shows a variation of the muffler in accordance with FIG. 3 that is designated, as a whole, by reference numeral 40 in FIG. 4. Muffler 40, in accordance with FIG. 4, as with that shown in FIG. 3, has a first muffler element 41 which substantially conforms to the first muffler element 31 described above. A second muffler element 42, in FIG. 4, acts as a reflection muffler, similar to the second muffler element 33 in FIG. 3. Here too, as in the embodiment of FIG. 3, two muffler inserts 43, 43' are arranged in the interior of combustion pipe 13, in axially spaced relationship to each other. A correspondingly designed perforated sheet serves as holder 44 for muffler 43, 43', similar to the one in FIG. 3.

For muffler inserts 43, 43', a noise muffling material in the form of a catalytic material, or a combination of catalytic material and noise muffling material is provided, whereby these materials, as a whole, are designated with reference numeral 45. Thus, the second muffler element 42, simultaneously, performs the function of catalytic combustion gas purification in a highly effective manner due to the fact that the catalytic conversion is carried out at relatively high temperatures. In instances where the heating device is fueled with Diesel oil, a soot filter material can be used instead of the catalytic material, with the result that the second muffler element 42 simultaneously serves as a soot filter.

As described above, various designs of mufflers 20, 20', 25, 25', 30, 40 are provided for the inventive heating device 1, which have the common feature that they are arranged in the combustion chamber 12 of heating device 1. Accordingly, the combustion noises, which are an unavoidable product of the combustion in combustion chamber 12, are directly and effectively muffled in proximity to their source, thereby eliminating the need for external muffler devices and facilitating a generally very quiet operation of the heating device. As previously pointed out, the noise muffling material 21, 21' can simultaneously have the properties of a catalytic agent for the catalytic after-treatment of the combustion gases; or, if appropriate, the mufflers can be provided with additional means therefor, utilizing, for instance, catalytic material 45. Correspondingly, sound muffling material 21, 21' can also have soot filtering properties for the purpose of removing soot particles from the combustion gases, or, alternatively, additional means can be provided for this purpose. Consequently, a dual benefit can be achieved by the application of the inventive concept of heating device 1, namely, a muffling of noises, as well as an extensive removal of harmful components from the combustion gases.

However, it is to be understood that the invention is not limited to the examples presented above but, instead, depending upon the space available in combustion chamber 12, individual aspects of the noise muffling means can be combined from the measures discussed above. Furthermore, as will now be described below, the integrated muffler concept of invention may be implemented by muffler means disposed at the downstream end of the heat exchanger of the heating device instead of at its combustion chamber.

Figure 5:
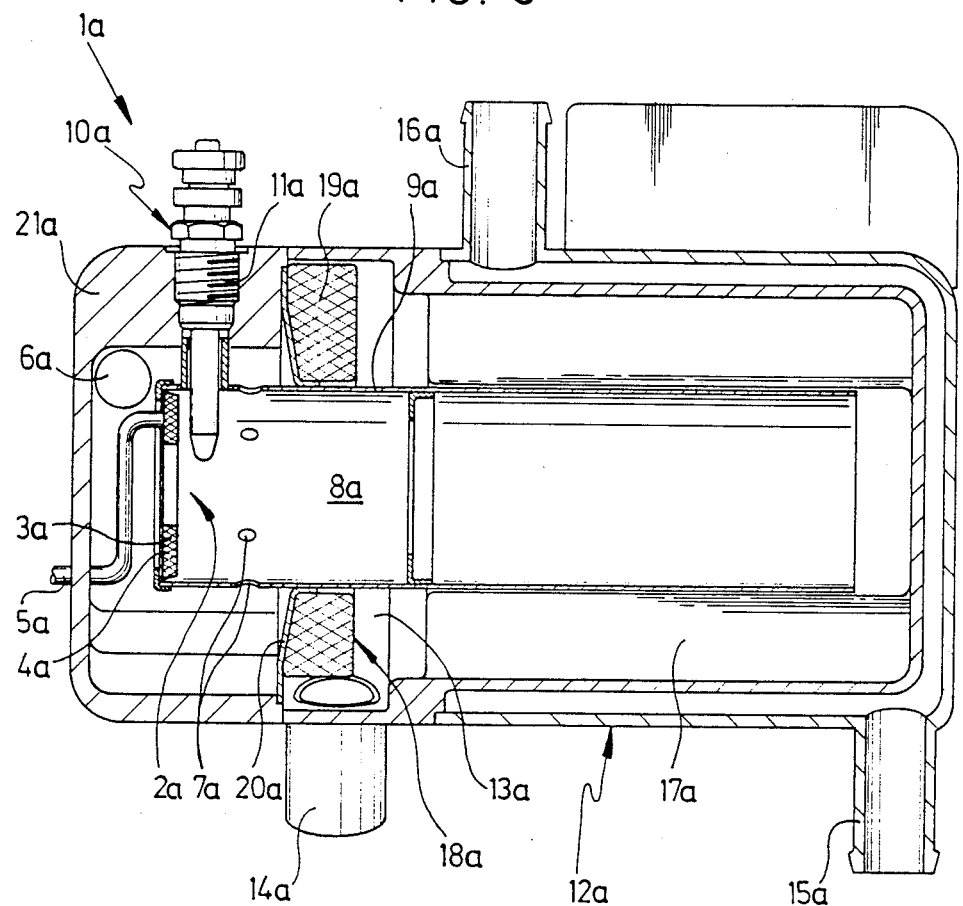
FIG. 5 is a schematic sectional view through a heating device having a muffler, in accordance with a further embodiment of the invention.

An axial cross-sectional view of a heating device 1a, utilized as an automotive heating device, is shown in FIG. 5 of the drawing. A vaporization burner 2a is depicted as an example of a burner, on the burner head side of heating device 1a (i.e., at the left portion of the drawing). Vaporization burner 2a has an absorbent body 3a on a carrier 4a. Fuel is passed to vaporization burner 2a via a fuel supply line 5a, which is schematically depicted in the drawing. Combustion air enters via the space around vaporization burner 2a via an inlet 6a and reaches the combustion space of combustion chamber 8a, in the vicinity of absorbent body 3a, via additional openings 7a in the combustion pipe 9a that defines combustion chamber 8a. The combustion air mixes with the fuel vapor delivered by vaporization burner 2a, and a combustible mixture forms around the absorbent body 3a.

Aided by ignition device 10a, which in the example depicted preferably consists of an elongated glow plug 11a, the combustion mixture is ignited in combustion chamber 8a, and burned. At the end of combustion chamber 8a, opposite vaporization burner 2a, the hot combustion gases thereby produced exit from chamber 8a and the direction of their flow deflected by approximately 180°. After reversing direction, the hot combustion gases travel through heat exchanger 12a and reach an exhaust gas collection chamber 13a, from which the gases are exhausted from the heating device via an exhaust gas outlet 14a.

The heat exchange medium, or heat carrier, enters heat exchanger 12a via an inlet 15a at one axial end of heat exchanger 12a and subsequently exits therefrom via an outlet 16a, provided in the vicinity of the opposite axial end of heat exchanger 12a. The heat carrier can be either a gaseous or liquid media. The interior of heat exchanger 12a has fins 17a which are distributed across its inner circumferential surface and serve to divide the combustion gas flow into parallelly directed partial gas streams.

A muffler, designated as a whole with reference numeral 18a, is provided in exhaust gas collection chamber 13a. In the preferred example depicted, this muffler 18a consists of a noise muffling material 19a that is in the form of an annular ring and is supported by way of a holder 20a in the exhaust gas collection chamber 13a. This holder 20a embraces the muffling material 19a at a minimum of two sides. Preferably, holder 20a contacts burner part 21a on one side and contacts the outer surface of combustion pipe 9a on another side.

The noise muffling material may be provided with openings in the form of bore holes, for instance, which are disposed in axial alignment with the passages for the partial gas streams formed between each adjacent pair of fins 17a. While this alignment is not shown in FIG. 5, it is similar to that shown in FIG. 7. This configuration achieves a muffling of noises utilizing a combination of absorption and reflection.

Additionally, it is also possible, by a corresponding design of the exhaust gas collection chamber 13a, to obtain supplemental noise muffling by the utilization of a cavity resonator.

Since, in the depicted example of the heating device 1a, noise muffler 18a is integrated into heating device 1a, i.e., is disposed in the area of exhaust gas collection chamber 13a, no noise muffler component has to be provided in the external exhaust gas line, which is not shown but attaches to exhaust gas outlet connecting flange 14a. Consequently, the installation of such a heating device 1a, for instance, into an automotive vehicle, is simplified, and additionally, there is a reduction in costs which may have been incurred for a separate muffler component.

In accordance with the inventive heating device 1a, hot combustion gases are produced in the combustion chamber 8a and which exit from combustion chamber 8a at the end which is opposite to vaporization burner 2a. The gases are then deflected at this point and subsequently pass through heat exchanger 12a. After passage through heat exchanger 12a, the cooled combustion gases collect in exhaust gas collection chamber 13a, and it is there that the noises of the combustion gases are directly muffled by muffler 18a before they depart from heating device 1a via exhaust gas outlet connecting flange 14a. As a consequence, such a heating device 1a can operate in a very quiet manner, as the noises of the exhaust gases are muffled before they leave the heating device.

Although the noise muffling material 19a is designed in the form of an annular disk, in the example depicted, such noise muffling material may assume any other form, or, alternatively, one or several noise muffling material elements can be arranged in exhaust gas collection chamber 13a. Furthermore, the design of exhaust gas collection chamber 13a is not limited to the form depicted, but different dimensions and/or designs can be employed therefor. Because the combustion gases are cooled during their passage through heat exchanger 12a, the noise muffling material 19a used in the exhaust gas collection chamber 13a need only be heat-stable rather than highly heat-resistant.

Figure 6:
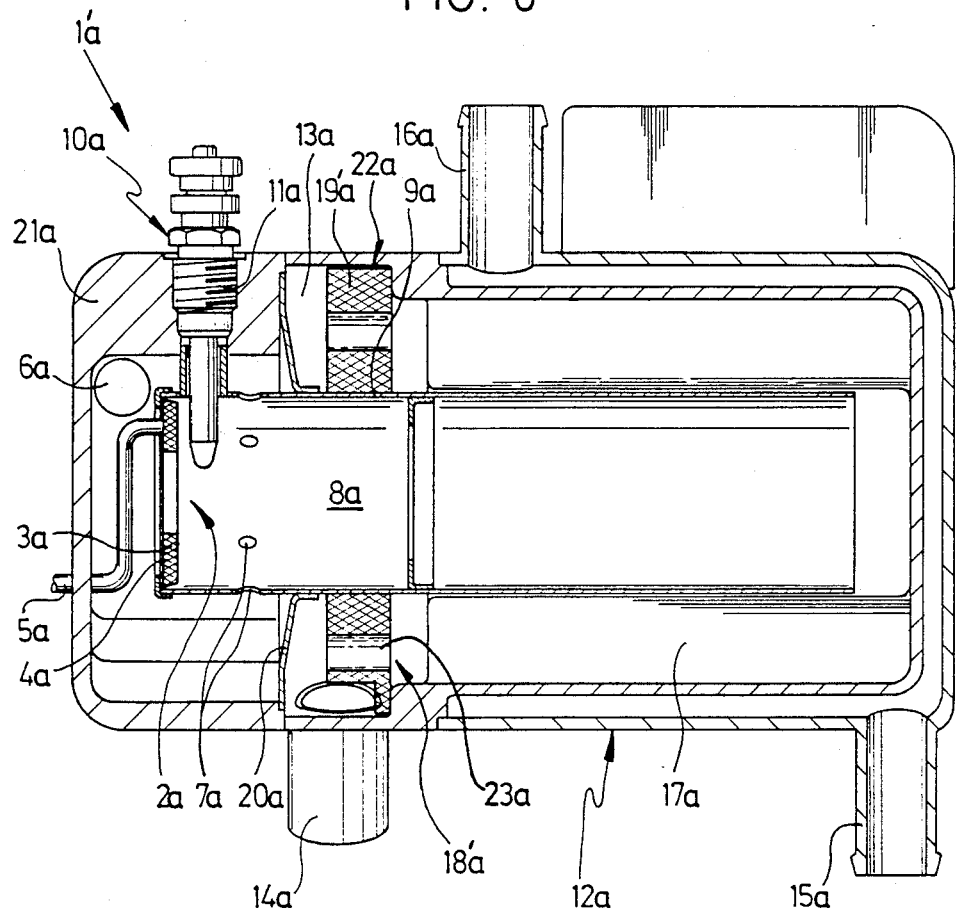
FIG. 6 is a sectional view of a heating device in accordance with FIG. 5, including another variation of a muffler device.
Figure 7:
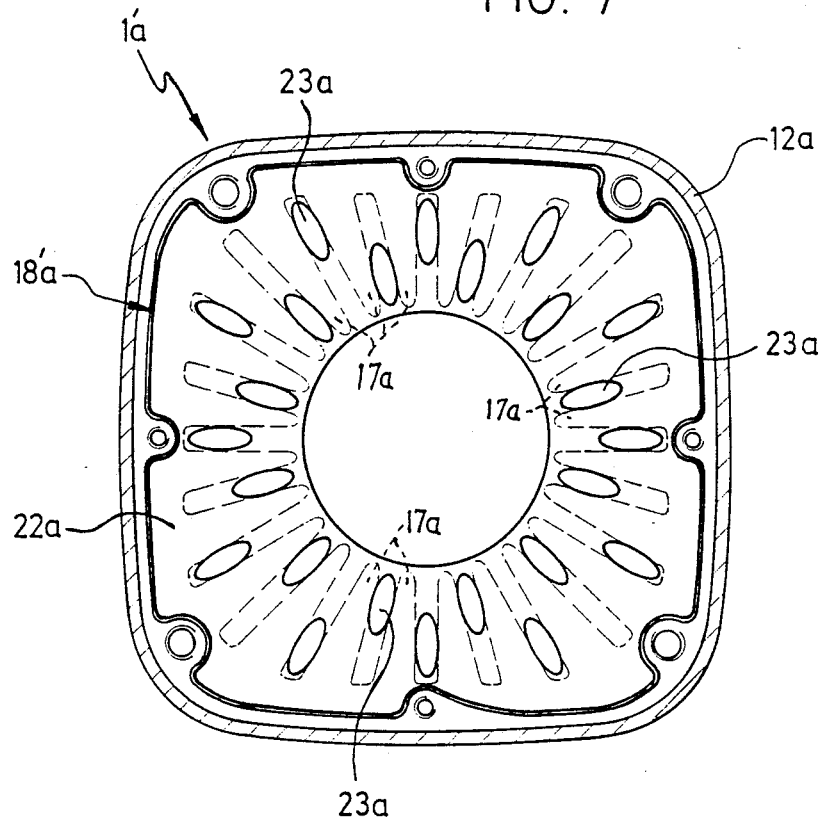
FIG. 7 is a frontal view of the muffler device according to FIG. 6.

Parts shown in FIGS. 6 and 7 that are identical or similar parts are designated with identical reference numerals, as is also the case in connection with the elements common to FIG. 5. In FIG. 6, the noise muffling material 19'a of muffler 18'a consists of a disk 22a in the noise muffler which directly mates against the end of heat exchanger 12a that faces into the exhaust gas collection chamber 13a and peripherally conforms to chamber 13a. Disk 22a has several openings 23a which transverse disk 22a in an axial direction and are distributed over its surface. The openings 23a do not necessarily have to be circular, but may be of an oval or similar shape. As can be seen from FIG. 6, the noise muffler material 19'a, in the form of disk 22a, for instance, directly conforms to the outlet end of heat exchanger 12a, and the muffler material 19a has been removed or offset from the exhaust gas collection chamber 13a in the area of exhaust gas outlet 16, so that the exhaust gases can exit without impedance.

FIG. 7 shows a preferred arrangement or distribution of axial openings 23a. The openings 23a are arranged here on two concentric circles, at a uniform circumferential distance from each other. Preferably, the radially inner openings 23a in disk 22a, however, are circumferentially offset in relationship to the radially more outward openings so that a larger clearance is obtained between adjacent openings 23a, ensuring cohesion and rigidity of muffler device 18'a. Furthermore, as shown, the openings 23a are axially aligned with the flow-through passages formed between each pair of adjacent fins 17a (shown in broken lines) of the heat exchanger 12a.

For mounting purposes, the outer contour of disk 22a is matched to the cross-sectional form of that end of heat exchanger 12a which faces toward burner 2a, so that this disk 22a can be reliably secured without additional holding and/or fastening devices. It is, of course, to be noted that several such disks 22a can be successfully arranged in an axial direction to form the noise muffler 18'a of heating device 18'a, whereby various muffling materials can be appropriately combined with each other. The selection of the number of openings 23a to be provided can be adapted based upon the respective usage, and no limitation regarding the number of openings represented is intended.

Figure 8:
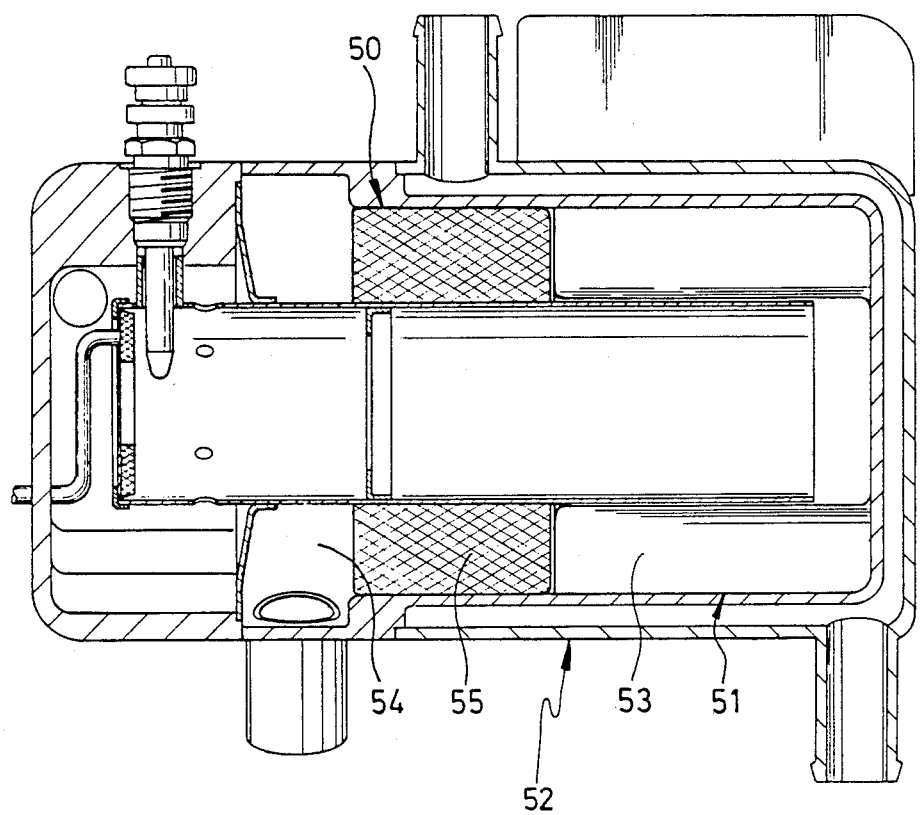
FIG. 8 is a schematic, sectional view of another embodiment of a heating device having an integrated muffler.

FIG. 8 shows a variation in which the muffler is designated, as a whole, with numeral 50. Here, the fins 53, defining the combustion gas flow-through channels 51 of heat exchanger 42, do not extend to the exhaust gas collection chamber 54. Instead, fins 53 are shortened relative to those of the previously described embodiments so that a portion thereof which is only minimally involved in the heat exchange process is eliminated. In the space 55, thus created, muffler 50 is positively and/or forcefully engaged to provide an effective noise muffling arrangement. Although not depicted in detail, one or more of the fins 53 can be extended in an axial direction, if required, so as to engage within muffler 50 to enable it to be secured in space 55 without additional holding elements. The muffler 50, thus provided, can effect noise muffling, based on the principles of reflection and/or absorption, and/or based upon the Helmholtz principle by employing a cavity resonator. These muffling methods can be realized individually or in combination to achieve the disclosed objective.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. In a heating device, particularly an automotive heating device, of a type having a burner and a cylindrical combustion chamber, defined by a combustion pipe, and a heat exchanger disposed concentrically about said combustion pipe, said burner being located at a first end of the combustion pipe and combustion gases exiting the combustion pipe through an opposite end thereof at which the flow of said combustion gases is reversed by a closed end of the heat exchanger so as to flow through the heat exchanger back toward the burner end of said combustion pipe within the heat exchanger, the improvement wherein a heat resistant, noise muffling material is integrated within a substantially flame-free zone of the combustion chamber of the heating device at which prevailing temperatures are sufficiently high to self-clean the muffling material of soot and other combustion generated substances.

2. Heating device according to claim 1, wherein the combustion pipe defining the combustion chamber is formed, at least in part, of said heat resistant, noise muffling material.

3. Heating device according to claim 1, wherein said muffling material has properties for, simultaneously, muffling sounds and catalytically purifying combustion gases produced by said burner.

4. Heating device according to claim 1, wherein said burner is a Diesel oil operated burner and said muffling material operates as a means for filtering soot particles from the combustion gases produced by said burner.

5. Heating device according to claim 1, wherein said muffling material is constructed to operate as a reflection muffler.

6. Heating device according to claim 1, wherein said muffling material is constructed to operate as an absorption muffler.

7. Heating device according to claim 1, wherein the muffling material consists of heat-resistant, perforated or porous material.

8. Heating device according to claim 1, wherein a flame supporting insert is provided in the combustion chamber, and wherein the muffling material is secured covering a circumferential surface of at least one of said combustion pipe and said flame supporting insert.

9. Heating device according to claim 2, wherein the muffling material is formed into a fibrous pipe.

10. Heating device according to claim 9, wherein the fibrous pipe extends axially past an open end of the combustion pipe.

11. Heating device according to claim 8, wherein the muffling material, at least in an area of a combustion chamber outlet end, is provided with peripherally distributed, radial through openings.

12. Heating device according to claim 11, wherein the radial through openings are arranged in several rows of axial spaced openings.

13. Heating device according to claim 12, wherein the through openings of adjacent rows of openings are arranged in a circumferentially offset manner with respect to each other.

14. Heating device according to claim 1, wherein the muffling material forms at least one muffler insert that is arranged to extend transversely across the combustion pipe.

15. Heating device according to claim 14, in that at least one said muffler insert is provided with at least one axial through opening.

16. Heating device according to claim 15, wherein the muffling material forms is comprised of a plurality of said muffler inserts having axial through openings, the axial through openings of adjacent muffler inserts being arranged in an offset manner relative to each other.

17. Heating device according to claim 16, wherein the muffler inserts include a holder, made of a perforated sheet having axial through openings, to which said noise muffling material has been applied thereon.

18. Heating device according to claim 17, wherein the muffling material comprises fleece wool.

19. Heating device according to claim 18, wherein the heat resistant noise muffling material includes means for catalytically treating the flow of combustion gases.

20. Heating device according to claim 19, wherein the muffler insert is comprised of layers of heat resistant noise muffling material and layers of catalytic material are arranged such that they are distributed across a transverse surface of the holder.

21. Heating device according to claim 1, wherein said muffling material comprises a heat resistant, noise muffling fleece material that is attached to at least one of the combustion pipe, a flame supporting insert within the combustion pipe and a holder therefor secured transversely across said combustion pipe.

22. In a heating device, particularly an automotive heating device, of a type having a burner and a cylindrical combustion chamber, defined by a combustion pipe, and a heat exchanger, having combustion gas channels, disposed concentrically about said combustion pipe, said burner being located at a first end of the combustion pipe and combustion gases exiting the combustion pipe through an opposite end thereof at which the flow of said combustion gases is reversed by a closed end of the heat exchanger so as to flow through said combustion gas channels of the heat exchanger back toward the burner end of said combustion pipe, the improvement wherein an exhaust gas collection chamber is positioned for receiving hot combustion gases exiting from the combustion gas channels; wherein said exhaust gas collection chamber is connected to an exhaust outlet of the heating device and is disposed at a location that is in proximity to the burner; and wherein a heat stable, noise muffling material is provided at said collection chamber and is disposed about said combustion pipe between said combustion gas channels and said exhaust outlet; whereby effective noise muffling is achieved without requiring enlargement of the heating device.

23. Heating device according to claim 22, wherein said muffling material is arranged for reducing noise by at least one of reflection and absorption noise muffling principles.

24. Heating device according to claim 22, wherein said noise muffling material is provided in said exhaust gas collection chamber.

25. Heating device according to claim 24, wherein the noise muffling material is in the form of an annular disk.

26. Heating device according to claim 22, the muffling material directly mates against an outlet end of the heat exchanger.

27. Heating device according to claim 25, wherein the noise muffling material seats on a wall of the exhaust gas collection chamber and is axially spaced away from the heat exchanger.

28. Heating device according to claim 25, wherein said annular disk of noise muffling material is provided with openings which extend axially in alignment with the combustion gas channels of the heat exchanger.

29. Heating device according to claim 25, wherein the annular disk of muffling material is attached to a holder which extends within the exhaust gas collection chamber.

30. Heating device according to claim 22, wherein said combustion gas channels of the heat exchanger are defined by fins that are distributed over the circumference of a surface of the heat exchanger and wherein the muffling material is arranged directly at an outlet of the combustion gases from the combustion gas channels.

31. Heating device according to claim 30, wherein the fins defining the combustion gas channels terminate short of an end of the heat exchanger that faces toward said exhaust gas outlet in a manner creating a space that serves as a receptacle for said muffling material.

32. Heating device according to claim 31, wherein at least one of the fins is extended in an axial direction for fixedly securing said muffling material.

* * * * *